United States Patent
Kashihara et al.

[11] Patent Number: 6,123,463
[45] Date of Patent: Sep. 26, 2000

[54] OPTICAL FIBER CONNECTOR WITH NON-PC-COUPLING

[75] Inventors: Koji Kashihara; Yutaka Kotohda; Hiroyasu Toyooka, all of Yokohama, Japan

[73] Assignee: Sumitomo Electric Industries, Ltd., Osaka, Japan

[21] Appl. No.: 08/990,448

[22] Filed: Dec. 15, 1997

[30] Foreign Application Priority Data

Dec. 16, 1996 [JP] Japan ................................. 8-336010

[51] Int. Cl.⁷ ....................................................... G02B 6/38
[52] U.S. Cl. ........................... 385/60; 385/721; 385/78; 385/59
[58] Field of Search ................................. 385/60, 72, 78, 385/53, 54, 55, 59, 71, 56, 61, 68

[56] References Cited

U.S. PATENT DOCUMENTS

| | | | |
|---|---|---|---|
| 5,636,298 | 6/1997 | Jiang et al. | 385/14 |
| 5,796,894 | 8/1998 | Csipkes et al. | 385/56 |

FOREIGN PATENT DOCUMENTS

| | | |
|---|---|---|
| 0 529 939 A1 | 3/1993 | European Pat. Off. . |
| 0 742 456 A1 | 11/1996 | European Pat. Off. . |
| 53-85146 | 7/1978 | Japan . |
| 59-79210 | 5/1984 | Japan . |
| 61-137107 | 6/1986 | Japan . |
| 2-226205 | 9/1990 | Japan . |
| 4-336509 | 11/1992 | Japan . |
| 6-3550 | 1/1994 | Japan . |
| 6-258552 | 9/1994 | Japan . |
| 6-281844 | 10/1994 | Japan . |
| 6-289254 | 10/1994 | Japan . |
| 7-294772 | 11/1995 | Japan . |
| 8-336010 | 8/1999 | Japan . |
| 1 493 992 | 12/1977 | United Kingdom . |
| 96/02861 | 2/1996 | WIPO . |

OTHER PUBLICATIONS

Patent Abstracts of Japan vol. 017, No. 184 (P–1519), Apr. 9, 1993 & JP 04 336509 A (Nippon Telegr & Teleph Corp), Nov. 24, 1992.

*Primary Examiner*—Phan T. H. Palmer
*Attorney, Agent, or Firm*—Pillsbury Madison & Sutro, LLP

[57] ABSTRACT

An optical fiber connector at least comprising an optical fiber ferrule capable of fixing an optical fiber, and an optical fiber fixed in the optical fiber ferrule, a pair of the optical fiber connectors being used such that their respective end faces are opposed to each other to connect the optical fibers; wherein the core portion at the end of the optical fiber is recessed inwardly of the end face of the cladding, and the end face of the optical fiber is recessed inwardly of the end face of the ferrule; whereby reduction in variations is achieved in connection loss occurring depending on whether PC coupling takes place or not, and variations in connection loss associated with multiple reflection.

15 Claims, 7 Drawing Sheets

OPTICAL FIBER CONNECTOR WITH NON-PC-COUPLING

This application is based on application No. 336,010/1996 filed Dec. 16, 1996 in Japan, the content of which is incorporated hereinto by reference.

BACKGROUND OF THE INVENTION

1. Field of the Invention

The present invention relates to an optical fiber connector for positioning and connecting optical fibers. More specifically, the invention relates to an optical fiber connector which can connect a plurality of opposed optical fibers simultaneously with a low connection loss.

2. Description of the Prior Art

In connecting optical fibers with an optical fiber connector, it is required (1) to reduce a connection loss at the point of connection (i.e. to achieve low connection loss) and (2) to reduce backward reflection at the point of connection (i.e. to achieve low reflection).

With a single-fiber connector, therefore, physical contact (PC) coupling, i.e., joining of the end faces of optical fibers in direct contact, has been put to practical use. For example, a polishing disk for an optical fiber connector as shown in Japanese Patent Application Laid-Open No. 137107/1986 has been developed.

With a multifiber connector, on the other hand, as the number of optical fibers increases, it becomes more difficult to achieve PC coupling with all fibers. Thus, (i) an attempt to achieve low reflection has been made by coupling optical connectors while interposing an index matching material, which has practically the same refractive index as that of the core of an optical fiber, between the end faces of optical fibers; or connecting optical fibers with their end faces being polished in an inclined shape. (ii) An attempt to achieve PC coupling which involves a low connection loss has been to protrude optical fibers slightly as described later.

However, the application of the index matching material for such connection as described in (i) above is a disadvantage to operating efficiency and handling. In the case of (ii), it is difficult to attain a complete PC coupling for all optical fibers in any combinations of connectors, if the connectors are of the same make.

Figure 1:
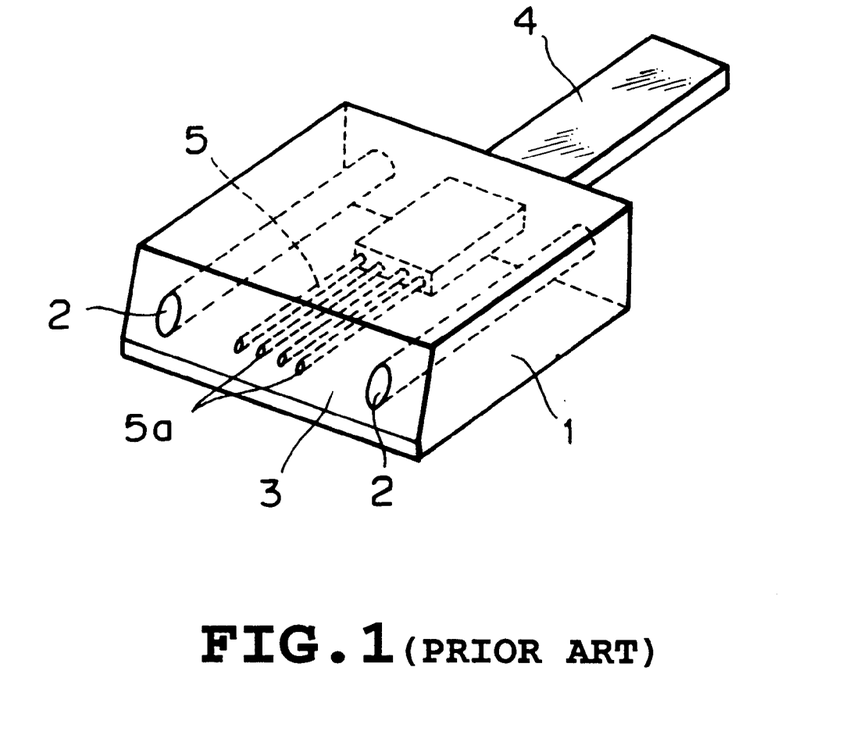
FIG. 1 is a perspective view showing an example of a conventional optical fiber connector.
Figure 2:
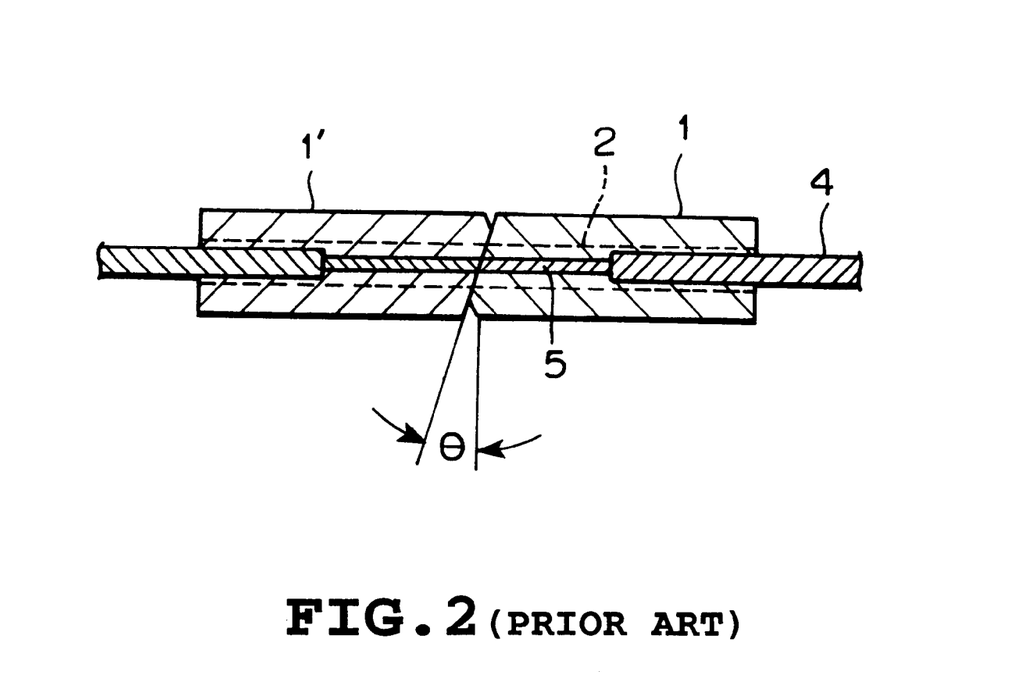
FIG. 2 is a cross section of the side view showing the state of joining of the optical fiber connectors illustrated in FIG. 1.

An optical fiber connector as shown in FIGS. 1 and 2 has been provided under these circumstances (a first embodiment in Japanese Patent Application Laid-Open No. 336509/1992, FIGS. 1 and 3). In the drawings, the numerals 1, 1' each denote a plastic molded multifiber ferrule, 2 a pair of guide pin insertion holes, 3 an end face of the ferrule, 4 an optical fiber tape, and 5 a plurality of optical fibers housed in the optical fiber tape 4. In FIG. 1, the plural optical fibers 5 in the optical fiber tape 4 are arranged and fixed in the ferrule 1 so as to be located between the pair of guide pin insertion holes 2. An end face 3 of the ferrule 1 is inclined at an angle θ to a plane perpendicular to the axis of the optical fiber 5, the angle being larger than the total reflection critical angle of propagated light in the optical fiber 5. A end face 5a of the optical fiber 5 slightly projects from the end face 3 parallel thereto.

According to this conventional optical fiber connector, the end faces of optical fibers are in intimate contact with each other. The light which is reflected from the inclined surface of the angle θ and which is attributable to a processing distortion layer having a high refractive index due to the polishing of the end faces of the fibers is considered not to propagate to the light source side, since this reflected light has an angle larger than the total reflection critical angle relative to the axes of the optical fibers. Thus, the conventional optical fiber connector has been regarded as realizing low reflection and low connection loss without using an index matching material.

The above conventional multifiber connector protrudes a plurality of optical fibers slightly from the end face of the ferrule, and brings the cores of the optical fibers into contact (PC coupling). This type of connector presents the problem that the larger the number of optical fibers, the more greatly the connection loss varies.

This is because the protruding lengths of the plural optical fibers are not necessarily identical, but are slightly different. The difference in the protruding lengths of the plural optical fibers is apt to cause a failure in providing a complete PC coupling of the optical fibers when they are connected. Such difference may also render the PC coupling incomplete when the connector are attached to or detached from each other, or when an external force such as bending is exerted.

When the PC coupling is not complete, the Fresnel reflection generates a connection loss of 0.3 dB in connecting the optical fibers. Multiple reflection, if any, between the optical fibers causes a connection loss of 0.6 dB at the greatest. Thus, whether the PC coupling of optical fibers is complete or not leads to variations in the connection loss.

The causes of such variations in connection loss are further explained in detail as follows:

(1) In the production of an optical fiber connector, the end faces of the optical fibers and the ferrule are polished for finishing. As a result of polishing, the optical fibers slightly protrude from the end face of the ferrule mainly because of the difference in hardness between the ferrule and the optical fiber. The protruding lengths of optical fibers become different for the reasons stated below.

Figure 3:
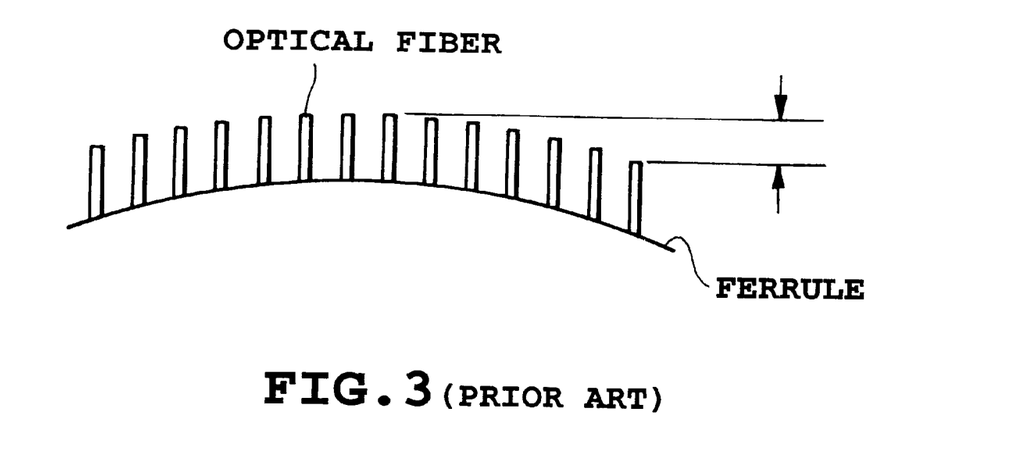
FIG. 3 is an explanation view showing a problem with conventional optical fibers.

(i) The polishing disk, as described earlier, is used to polish the ferrule for contact (PC coupling) between the cores of optical fibers so that a plurality of optical fibers are slightly protruded from the end face of the ferrule. For this purpose, the polishing disk is constituted to be elastic and relatively small in thickness. Thus, the polishing disk undergoes elastic deformation during polishing of the ferrule end face. As a result, the end face of the ferrule has a mountain-shaped shear droop after polishing, as shown in FIG. 3.

Figure 4:
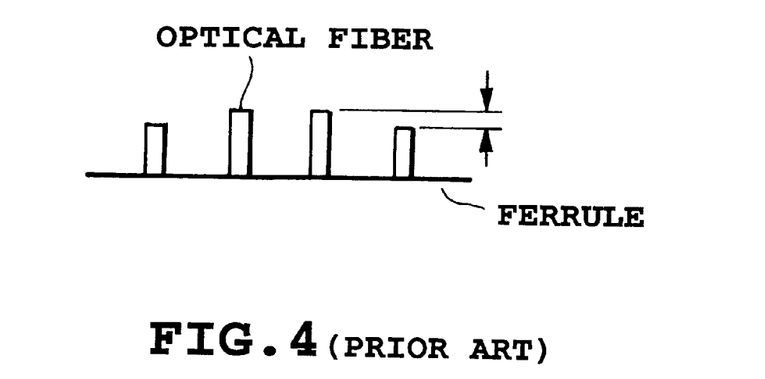
FIG. 4 is an explanation view showing another problem with conventional optical fibers.

(ii) Variations in the polishing speed cause different protruding lengths of optical fibers as illustrated in FIG. 4. (2) If the protruding lengths of optical fibers from the end face of the ferrule are different for the above causes, the PC coupling of optical fibers becomes difficult. The failure to achieve a complete PC coupling of the optical fibers results in the creation of an air layer between the optical fibers to be connected, which causes connection losses due to the Fresnel reflection as described earlier.

SUMMARY OF THE INVENTION

The object of the present invention is to provide an optical fiber connector which can connect a plurality of opposed optical fibers simultaneously with a low connection loss.

An optical fiber connector according to the present invention is characterized by a structure which is free from PC coupling (non-PC-coupling structure) and thereby reducing such variations in connection loss as may otherwise arise from Fresnel reflection depending on whether a complete PC coupling takes place or not.

That is, the optical fiber connector of the invention at least comprises an optical fiber ferrule capable of fixing an optical fiber, and an optical fiber fixed in the optical fiber ferrule, a pair of the optical fiber connectors being used such that their respective end faces are opposed to each other to connect the optical fibers; wherein the core portion at the end face of the optical fiber is recessed inside the optical fiber relative to the cladding.

The above constitution, in which the core is recessed relative to the cladding at the end face of the optical fibers, and in which no PC coupling is made at the end faces of the optical fibers, enables the attainment of substantial uniformity in the connection loss of the optical fibers. A concrete structure is exemplified in the end face structure of an optical fiber as shown in FIGS. 5 to 8.

Figure 5:
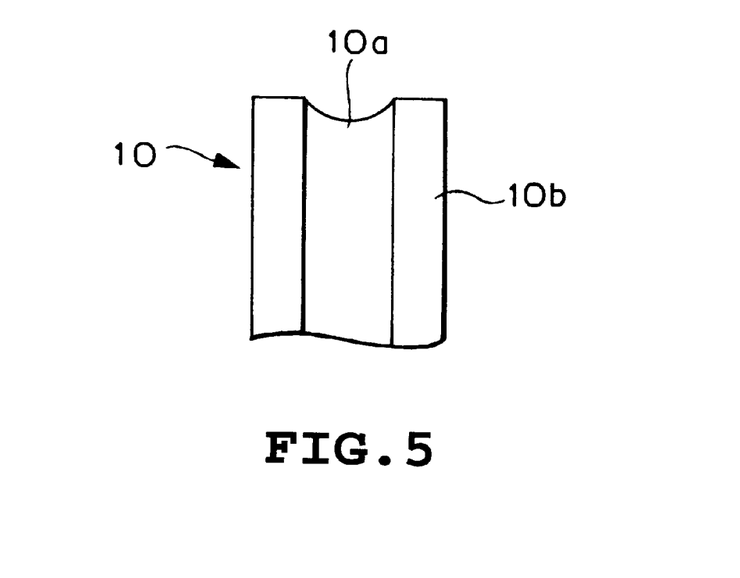
FIG. 5 is a sectional view of the end of an optical fiber, showing an embodiment of the present invention.

In the structure of FIG. 5, an optical fiber 10 comprising a core 10a and a cladding 10b surrounding it has an end face on which the core 10a is recessed with a concave curved surface relative to the cladding 10b.

Figure 6:
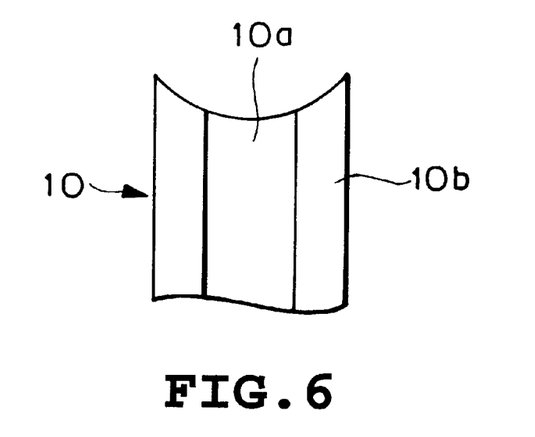
FIG. 6 is a sectional view of the end of an optical fiber, showing another embodiment of the present invention.

In the structure of FIG. 6, a core 10a and a cladding 10b are formed to have a continuous concave curved surface on the end face of an optical fiber 10, with the middle of the core 10a being recessed innermostly.

Figure 7:
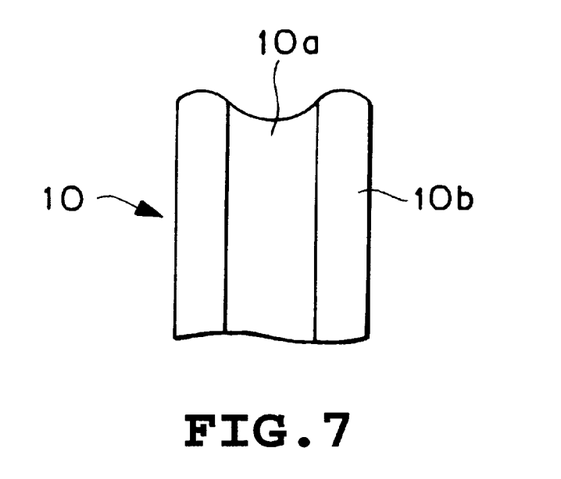
FIG. 7 is a sectional view of the end of an optical fiber, showing still another embodiment of the present invention.

In the structure of FIG. 7, the outer peripheral edge of cladding 10b is rounded in the structure of FIG. 6.

Figure 8:
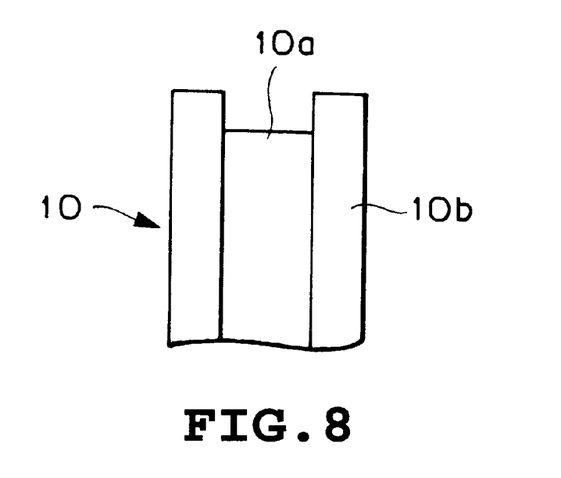
FIG. 8 is a sectional view of the end of an optical fiber, showing a further embodiment of the present invention.

In the structure of FIG. 8, the end faces of a cladding 10b and a core 10a are horizontal and parallel to each other, with the vertical position of the core 10a being recessed inwardly of the vertical position of the cladding 10b.

The factor common to these different end face shapes is that the foremost position of the end face of the core 10a is always level with, or recessed inwardly of, the foremost position of the end face of the cladding 10b. As long as this factor is achieved, the invention is not restricted to the above-mentioned shapes.

Figure 9:
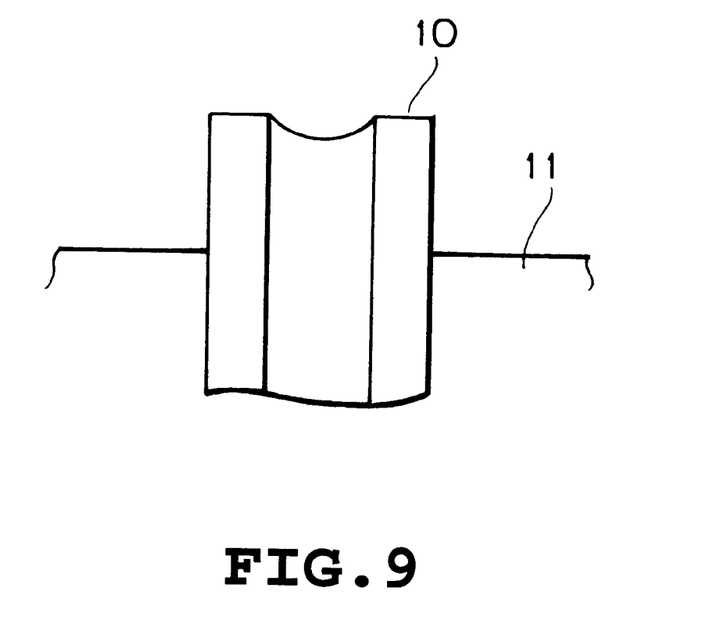
FIG. 9 is a sectional view of a ferrule and the end of an optical fiber mounted on the ferrule, showing a still further embodiment of the present invention.
Figure 10:
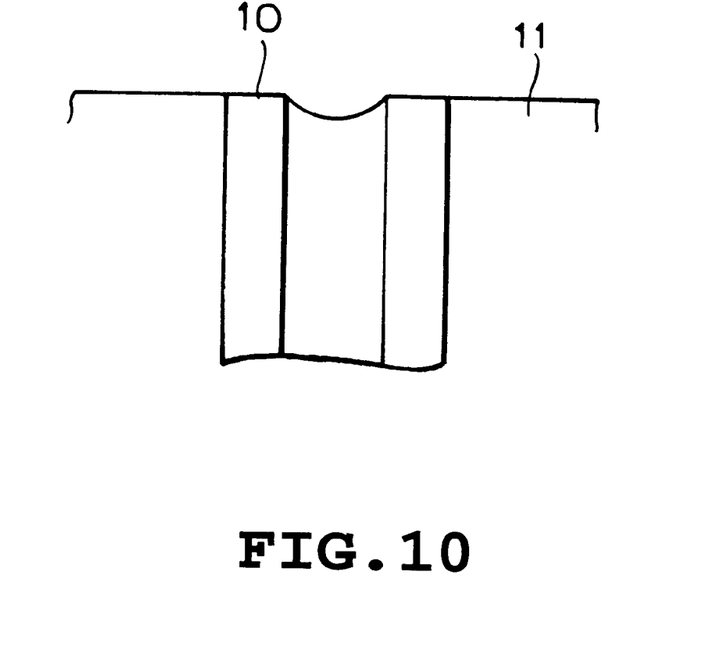
FIG. 10 is a sectional view of a ferrule and the end of an optical fiber mounted on the ferrule, showing an additional embodiment of the present invention.
Figure 11:
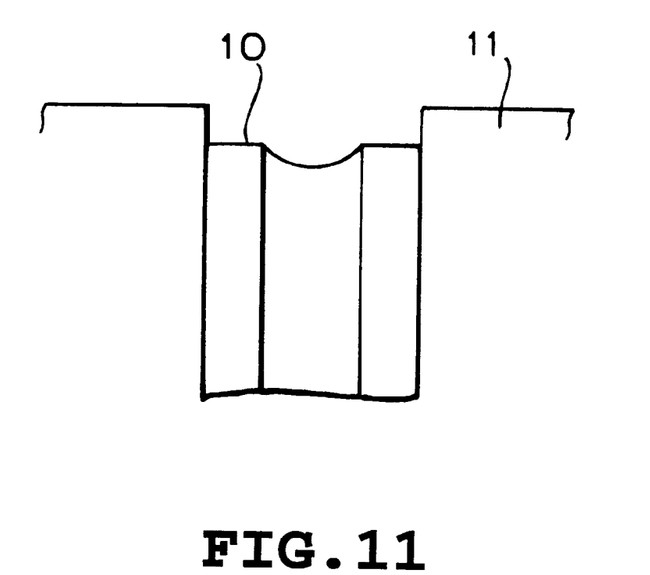
FIG. 11 is a sectional view of a ferrule and the end of an optical fiber mounted on the ferrule, showing a still additional embodiment of the present invention.

An optical fiber having the end face structure described above may be mounted on a ferrule in the manners as shown in FIGS. 9 to 11: In FIG. 9, an optical fiber 10 is protruded from the end face of a ferrule 11. In FIG. 10, the end face of a cladding 10b of an optical fiber 10 is coplanar with the end face of a ferrule 11. In FIG. 11, the end face of an optical fiber 10 is recessed inwardly of the end face of a ferrule 11. The present invention is most effective in the case illustrated in FIG. 11 in which the end face of the optical fiber 10 is recessed inwardly of the end face of the ferrule 11.

In the foregoing constitution, the recessed shape of the core may be concave. This constitution, in which the core has a concave curved surface as shown in FIGS. 5, 6 and 7, can reduce not only variations in connection loss due to multiple reflection but also a backward reflection.

In the above constitution, the dimension of the recess is 0.2 μm or more. The desirable dimension of the recess at which no multiple reflection nor PC coupling occurs is 0.2 μm or more.

In the above constitution, the end face of the optical fiber may be inclined relative to a plane perpendicular to the optical axis of the optical fiber. This constitution corresponds to the need that the optical end face of the optical fiber be inclined relative to a plane perpendicular to the optical axis of the optical fiber so that the backward reflection may be reduced.

In the above constitution, the material of the ferrule may be a plastic. It is advisable to use such a material as is not only of high practical utility but also economical in production. However, the ferrule of the optical fiber connector according to the present invention is not restricted to the plastic material.

In the above constitution, the optical fiber may comprise a plurality of optical fibers, and these optical fibers may be positioned as a unit relative to the ferrule. This constitution shows that the invention is applicable not only to a single optical fiber, but also to a multiplicity of optical fibers.

In the above constitution, the optical fibers to be connected are a multi-mode optical fiber, but it may also be applicable to a single-mode fiber. According to a system using a multi-mode optical fiber, it is important that variations in connection loss, rather than the value of connection loss, be reduced. Therefore, the present invention is preferably applied to a multi-mode optical fiber.

In the above constitution, the optical fiber connector may further include a connecting adapter for fixing one of the ferrules and the other ferrule in an opposed, intimately contacted condition. In the above constitution, moreover, the end face of the optical fiber may be inclined 4° or more relative to a plane perpendicular to the optical axis of the optical fiber, and an index matching material may be absent on the end face of the optical fiber.

The above exemplifies the constitutions which are in frequent practical use, but the present invention is not restricted to them.

Figure 12:
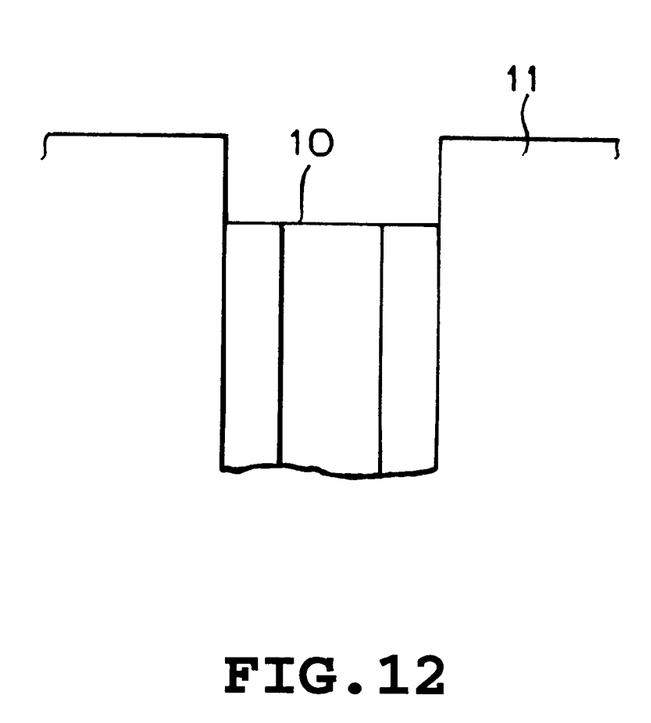
FIG. 12 is a sectional view of a ferrule and the end of an optical fiber mounted on the ferrule, showing a further additional embodiment of the present invention.

As stated previously, a difference in connection loss arises depending on whether a complete PC coupling takes place or not. To dissolve this discrepancy, the present invention is characterized by positively adopting a structure free from PC coupling (non-PC-coupling structure); thereby reducing variations in the value of connection loss, although a loss due to Fresnel reflection occurs. As another constitution, as shown in FIG. 12, the end face of an optical fiber 10 may comprise the coplanar surfaces of a core and a cladding; however, the end face of the optical fiber 10 may be recessed inwardly of the end face of a ferrule 11.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The present invention will now be described in more detail by reference to embodiments, which do not restrict the invention.

Figure 13:
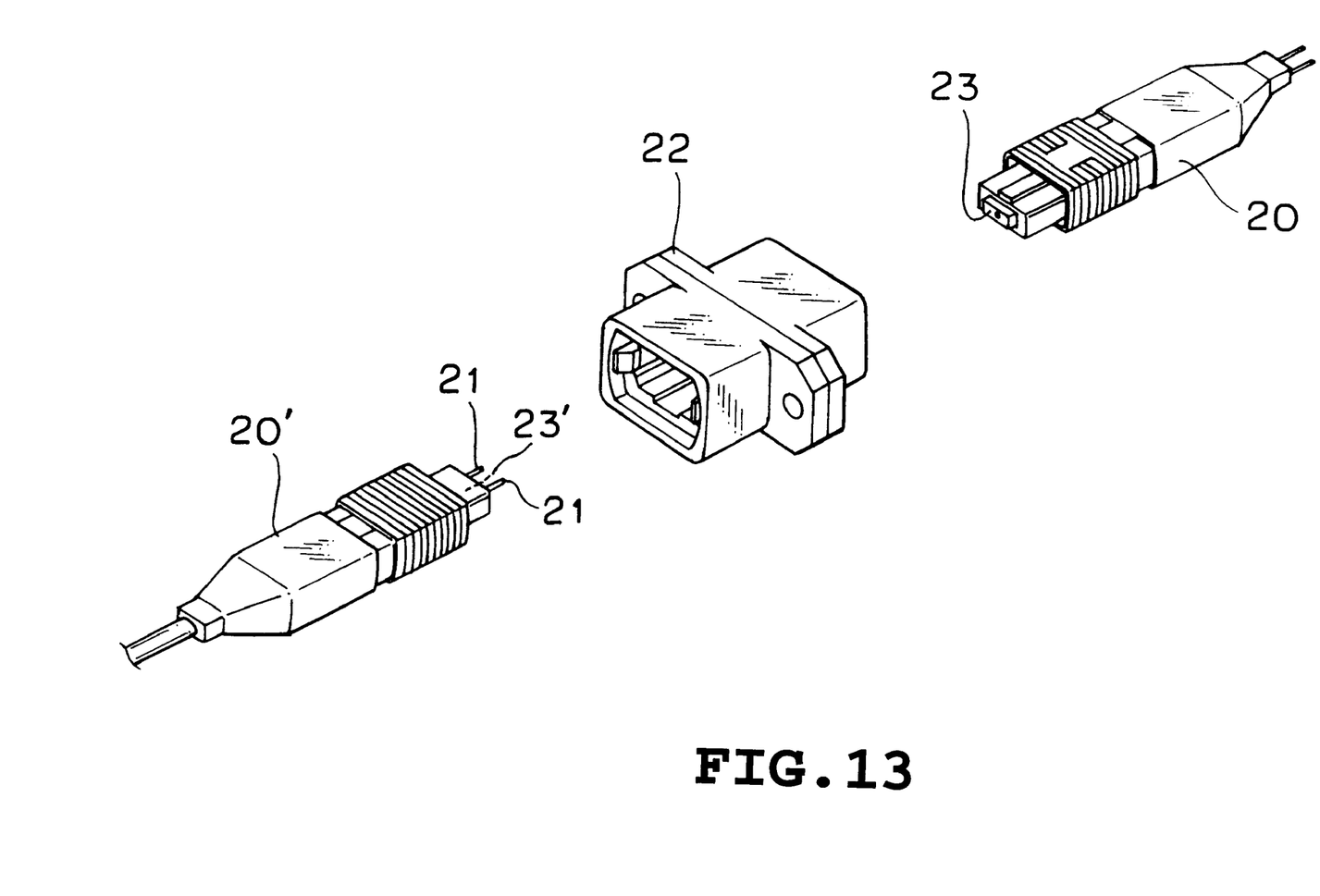
FIG. 13 is a perspective view of an embodiment of an optical fiber connector according to the present invention before being connected.

FIG. 13 shows the appearance of an optical fiber connector as an embodiment of the invention. This embodiment uses an MPO connector evaluated highly as a multifiber connector. The connector is composed of a first and a second connector plug 20 and 20', fitting pins 21, and an adapter 22. The first and second connector plugs 20 and 20' have first and second built-in plastic ferrules 23 and 23', respectively, which hold optical fibers.

Figure 14:
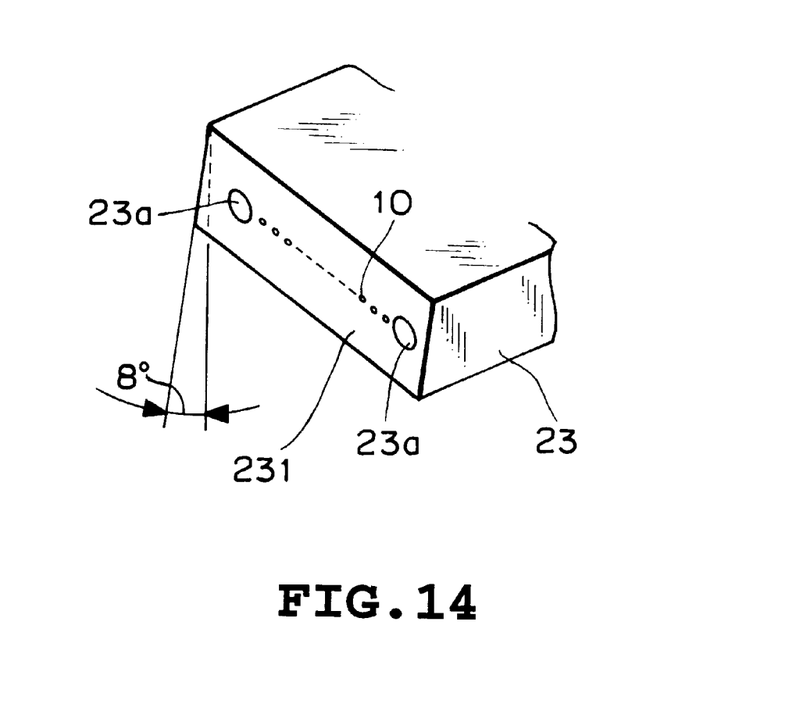
FIG. 14 is an enlarged perspective view of a ferrule end face of the optical fiber connector shown in FIG. 13.

As shown in FIG. 14, the first ferrule 23 has two fitting holes 23a for insertion of the fitting pins 21 provided in the second ferrule 23'. Between the two fitting holes 23a, optical fibers 10 are arranged transversely in a row. The optical fibers 10 comprise twelve GI type optical fibers with a cladding diameter of 125 µm and a core diameter of 62.5 µm. To reduce the backward reflection by an end face 231 of the ferrule 23, the end face 231 of the ferrule 23 needs to be processed to be inclined at an angle of 4° or more. In the instant embodiment, the end face 231 is polished to be inclined at an angle of 8°. The other ferrule 23' is also formed in the same manner.

Figure 15:
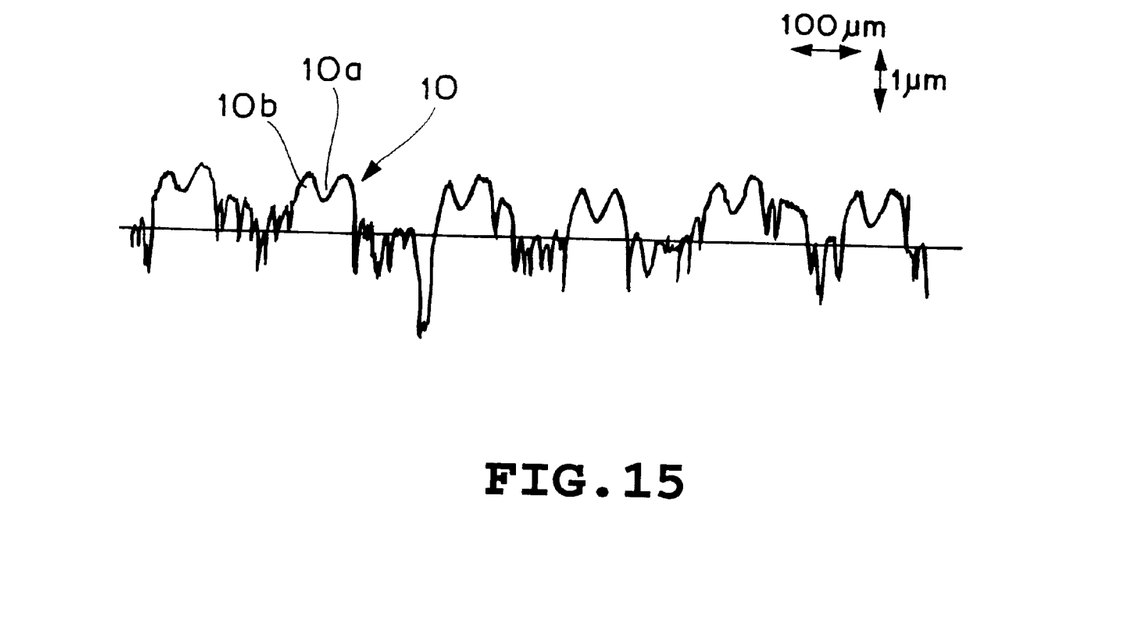
FIG. 15 is a graph for the results of measurement, with a contact type surface roughness meter, of the end face shapes of optical fibers arranged in a row on the end face of an optical fiber connector according to an embodiment of the present invention.

To achieve non-PC coupling in the ferrules 23 and 23', it is necessary to recess the optical fiber 10 inwardly of the ferrule end face 231 as illustrated in FIGS. 11 and 12, or recess only the core 10a of the optical fiber 10 as illustrated in FIGS. 5 to 8. Thus, attention was paid to the difference in hardness between the core 10a and the cladding 10b of the optical fiber 10, and only the core 10a was recessed by polishing. The shapes, relative to the ferrule end face 231, of the twelve optical fibers 10 arranged in a row after polishing were measured with a well known contact type surface roughness meter. The results are shown in FIG. 15. The core 10a portion in the middle of the optical fiber 10 is drawn inward by about 0.5 µm in a concave form, which shows that the core 10a was relatively recessed because of the difference in the polishing speed between the core 10a and the cladding 10b. The polishing conditions involved cerium oxide as a polishing agent, water as a polishing liquid, and a raised cloth as a polishing cloth so that the difference in hardness between the core and the cladding would appear as the difference in polishing speed. By changing the polishing conditions such as polishing agent, polishing liquid, polishing cloth, polishing pressure and polishing time, it becomes possible to realize the recess of the core and modify it.

The results on the connection loss of the 12-fiber connector obtained in the above-described manner are given in Table 1. The average loss was 0.39 dB, a somewhat high value as a GI type optical connector. However, the minimum value was 0.30 dB, representing Fresnel loss. In this view, the loss due to other factors such as axial deviation was an average of 0.09 dB, i.e., reasonable results. The standard deviation was 0.05, a characteristic comparable to a single-fiber connector.

A mating/unmating test of the connector revealed loss variations of 0.2 dB or less in 100 mating/unmating operations. This is a third or less of the variation obtained with a conventional connector.

TABLE 1

|  | Connection loss (dB) |
| --- | --- |
| Average | 0.39 |
| Maximum | 0.50 |
| Minimum | 0.30 |
| Standard deviation | 0.05 |

The above-mentioned embodiment concerns a multifiber connector. However, the present invention can be practiced with a single-fiber connector, as well as with any optical fibers having similar material properties.

The optical fiber connector of the present invention can be applied not only as a connector for connecting optical fibers, but as a connector for connecting optical fibers with LD or PD. By the wording "optical fiber connector", the invention is meant to include an optical coupling member for connecting optical fibers with LD or PD as mentioned above. Such an optical coupling member can be expected to reduce external feedback of reflected light, since the core portion is concave.

The aforementioned embodiment adopted the manner of fixing the connectors together by use of an adapter. It is evident, however, that the manner of fixing the connectors using a conventional fixing spring is likewise applicable to the invention.

As described above, the present invention is characterized by positively employing a structure free from PC coupling (a non-PC-coupling structure), thereby decreasing variations in the value of loss, although causing a loss due to Fresnel reflection. More specifically, the invention is characterized by recessing the core portion at the coupling end of an optical fiber relative to the cladding.

Thus, the optical fiber connector of the invention is effective for preventing variations in connection loss occurring depending on whether PC coupling takes place or not, and variations in connection loss associated with multiple reflection.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical fiber connector comprising:
    at least one first optical fiber having a core portion and a cladding portion,
    at least one second optical fiber having a core portion and a cladding portion to be optically coupled to said first optical fiber at respective coupling ends of said first and second optical fibers,
    a first optical fiber ferrule having a first end face said first optical fiber being fixed to said first optical fiber ferrule so as to be exposed on the first end face, and a second optical fiber ferrule which has a second end face adapted to be opposed to and intimately contacted with the first end face of the first optical fiber ferrule when operatively engaged therewith, said second optical fiber being fixed to said second optical fiber ferrule so as to be exposed on the second end face;

the core portion at the coupling end of each said optical fiber being recessed inwardly of the optical fiber relative to the cladding portion so that when said first optical fiber and said second optical fiber are optically connected, the core portions of each optical fiber do not physically contact each other.

2. The optical fiber connector as claimed in claim 1, wherein the coupling end face of each said optical fiber is recessed inwardly from the end face of each said optical fiber ferrule.

3. The optical fiber connector as claimed in claims 1 or 2, wherein the recessed shape of the core portion is concave.

4. The optical fiber connector as claimed in claims 1, wherein the dimension of recess of the core portion is 0.2 µm or more.

5. The optical fiber connector as claimed in claim 1, wherein the end face of each said optical fiber is inclined relative to a plane perpendicular to the optical axis of each said optical fiber.

6. The optical fiber connector as claimed in claim 1, wherein the material for each said ferrule is a plastic material.

7. The optical fiber connector as claimed in claim 1, wherein said first and second optical fibers each comprise a plurality of optical fibers, and said first and second optical fibers are positioned as a unit relative to said first and second ferrules, respectively.

8. The optical fiber connector as claimed in claim 1, wherein each said optical fiber is a multi-mode optical fiber.

9. The optical fiber connector as claimed in claim 1, further including a connecting adapter for fixing said first ferrule and said second ferrule in an opposed, intimately contacted condition.

10. The optical fiber connector as claimed in claim 1, wherein the end face of each said optical fiber is inclined 4° or more relative to a plane perpendicular to the optical axis of each said optical fiber, and no index matching material is present on the end face of each said optical fiber. each said optical fiber ferrule.

11. The optical fiber connector as claimed in claim 1, wherein said first and second optical fibers are coplanar with each of said end faces of said optical fiber ferrules.

12. The optical fiber connector as claimed in claim 1, wherein said first optical fiber protrudes from said end face of said first optical fiber ferrule, and said second optical fiber is recessed inwardly from the end face of said second optical fiber ferrule.

13. The optical fiber connector as claimed in claims 1, 2, 11, or 12, wherein the recessed shape of the core portion of said optical fiber is flat and parallel to the coupling end of said optical fiber, being recessed inwardly of the end position of the cladding.

14. The optical fiber connector as claimed in claims 1, 2. 11, or 12, wherein the core portion and the cladding are formed to have a continuous concave curved surface on the coupling end of the optical fiber, with the cladding having an outer peripheral edge.

15. The optical fiber connector as claimed in claim 14, wherein the outer peripheral edge of the cladding is rounded or chamfered.

* * * * *